(12) United States Patent
Ikeda et al.

(10) Patent No.: US 12,146,433 B2
(45) Date of Patent: Nov. 19, 2024

(54) CONTROLLER FOR HYDROGEN ENGINE

(71) Applicant: TOYOTA JIDOSHA KABUSHIKI KAISHA, Toyota (JP)

(72) Inventors: Yuto Ikeda, Okazaki (JP); Koji Umezawa, Susono (JP); Makoto Yamazaki, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/587,969

(22) Filed: Feb. 27, 2024

(65) Prior Publication Data

US 2024/0344475 A1 Oct. 17, 2024

(30) Foreign Application Priority Data

Apr. 12, 2023 (JP) ................... 2023-064877

(51) Int. Cl.
*F01N 3/20* (2006.01)
*F02D 41/02* (2006.01)
*F02P 5/15* (2006.01)

(52) U.S. Cl.
CPC ......... *F01N 3/208* (2013.01); *F02D 41/0245* (2013.01); *F02P 5/1504* (2013.01); *F01N 2610/02* (2013.01); *F01N 2900/1602* (2013.01)

(58) Field of Classification Search
CPC .............. F01N 3/208; F01N 2610/02; F01N 2900/1602; F01N 3/2066; F02D 41/0245; F02P 5/1504

USPC ............................................ 60/320
See application file for complete search history.

(56) References Cited

U.S. PATENT DOCUMENTS

| 2008/0202097 A1* | 8/2008 | Driscoll | ............ B01D 53/9495 60/274 |
| 2018/0038302 A1* | 2/2018 | Kanno | .................. F01N 13/009 |

FOREIGN PATENT DOCUMENTS

JP 2006320854 A 11/2006

* cited by examiner

*Primary Examiner* — Kenneth J Hansen
*Assistant Examiner* — Kelsey L Stanek

(57) ABSTRACT

A controller for a hydrogen engine controls a hydrogen engine including a selective catalytic reduction (SCR) device installed in an exhaust passage and a urea addition valve that adds urea to exhaust gas flowing through a portion of the exhaust passage upstream of the SCR device. Processing circuitry of the controller executes a reduction process that causes a urea addition amount of the urea addition valve to be smaller when a urea deposition amount of the SCR device is greater than or equal to a prescribed value than when the urea deposition amount is less than the prescribed value. The processing circuitry executes a lean-burn limiting process that sets an air-fuel ratio of an air-fuel mixture to be burned in the hydrogen engine to a value less than or equal to a prescribed lean-burn limiting value while the reduction process is reducing the urea addition amount.

5 Claims, 3 Drawing Sheets

CONTROLLER FOR HYDROGEN ENGINE

BACKGROUND

1. Field

The present disclosure relates to a controller for a hydrogen engine.

2. Description of Related Art

In the field of engine exhaust purification systems, there exists a system known as the urea selective catalytic reduction (SCR) system. The urea SCR system includes a urea addition device, which adds urea water to exhaust gas, and an SCR device, which reduces nitrogen oxide (NOx) in the exhaust gas through selective catalytic reduction.

Japanese Laid-Open Patent Publication No. 2006-320854 discloses a controller for a diesel engine with a urea SCR system. When the amount of urea deposited in the SCR device is greater than or equal to a specified value, the controller performs a burning control for burning the deposited urea by increasing the temperature of the exhaust gas.

The above-described urea SCR system may be employed in a hydrogen engine. A hydrogen engine typically has a lower exhaust gas temperature than a diesel engine. When the exhaust gas temperature is low, it is difficult for the temperature of the SCR device to rise. The deposition of urea in the SCR device tends to progress more when the temperature of the device is low. Therefore, when if a urea SCR system is employed in a hydrogen engine, the frequency of implementing burning control may be increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for a hydrogen engine is configured to control a hydrogen engine including a selective catalytic reduction device installed in an exhaust passage and a urea addition device that adds urea to exhaust gas flowing through a portion of the exhaust passage upstream of the selective catalytic reduction device. The controller includes processing circuitry. The processing circuitry is configured to execute a reduction process that causes a urea addition amount of the urea addition device to be smaller when a urea deposition amount of the selective catalytic reduction device is greater than or equal to a prescribed value than when the urea deposition amount is less than the prescribed value. The processing circuitry is also configured to a lean-burn limiting process that sets an air-fuel ratio of an air-fuel mixture to be burned in the hydrogen engine to a value less than or equal to a prescribed lean-burn limiting value while the reduction process is reducing the urea addition amount. The lean-burn limiting value is richer than an upper limit value of a control range of the air-fuel ratio in a case in which the reduction process is not reducing the urea addition amount.

The controller for a hydrogen engine suppresses deposition of urea in the selective catalytic reduction device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Figure 1:
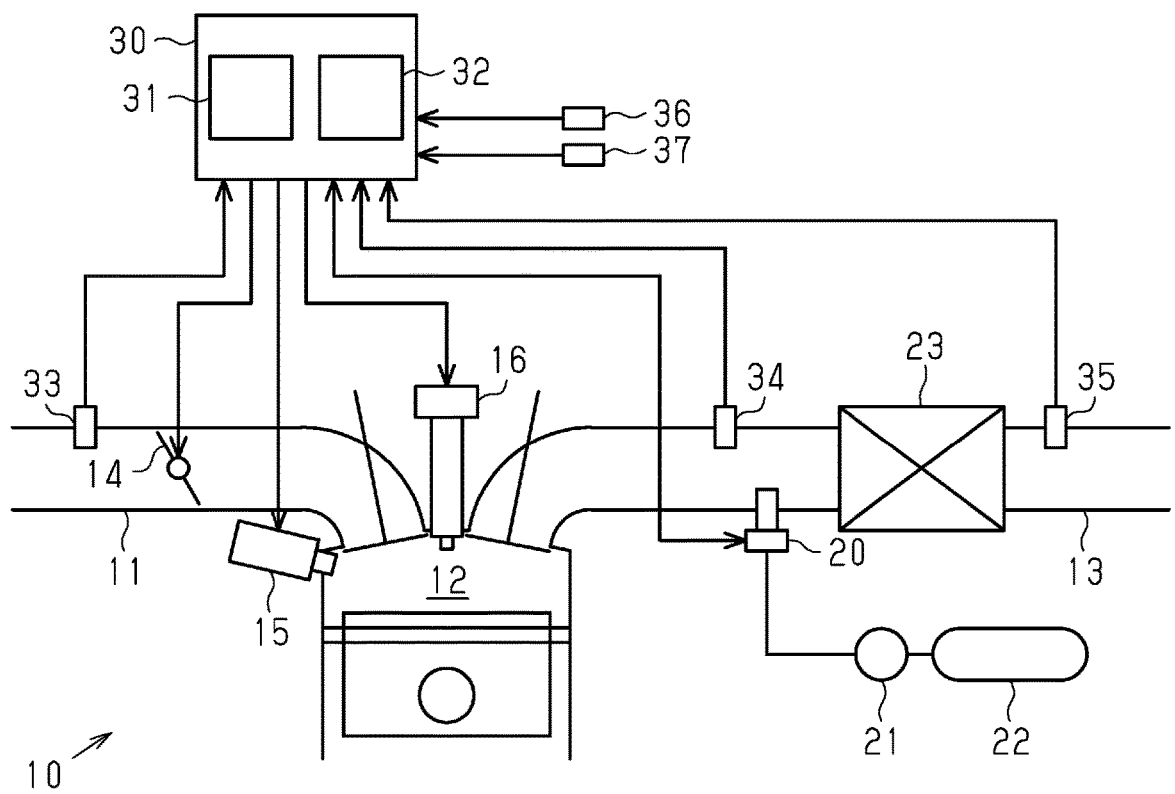
FIG. 1 is a schematic diagram showing a controller for a hydrogen engine according to one embodiment.

Hereinafter, an embodiment of a controller for a hydrogen engine will be described in detail with reference to FIGS. 1 to 3. A controller according to the present embodiment is configured as a device that controls a hydrogen engine mounted on a vehicle.

Configuration of Hydrogen Engine 10

First, a configuration of a hydrogen engine 10 to which a controller according to the present embodiment is applied will be described with reference to FIG. 1. The hydrogen engine 10 includes an intake passage 11, a combustion chamber 12, and an exhaust passage 13.

A throttle valve 14 is provided in the intake passage 11. The throttle valve 14 is a valve that adjusts the flow rate of intake air in the intake passage 11. Intake air is introduced into the combustion chamber 12 through the intake passage 11. An injector 15 and an ignition device 16 are installed in the combustion chamber 12. The injector 15 forms a mixture of the intake air and the hydrogen gas in the combustion chamber 12 by injecting the hydrogen gas. The ignition device 16 ignites the air-fuel mixture in the combustion chamber 12 by spark discharge. Exhaust gas generated by the combustion of the air-fuel mixture in the combustion chamber 12 is discharged to the exhaust passage 13.

A urea addition valve 20 is provided in the exhaust passage 13. A urea water tank 22 is connected to the urea addition valve 20 via a urea pump 21. The urea pump 21 feeds the urea water stored in the urea water tank 22 to the urea addition valve 20. The urea addition valve 20 adds the urea water sent from the urea pump 21 to the exhaust gas in the exhaust passage 13. In the present embodiment, the urea addition valve 20, the urea pump 21, and the urea water tank 22 constitute a urea addition device.

An SCR (selective catalytic reduction) device 23 is installed in a portion of the exhaust passage 13 downstream of the urea addition valve 20. The urea water added to the exhaust gas by the urea addition valve 20 is hydrolyzed into ammonia. The SCR device 23 reduces and purifies NOx in the exhaust gas with ammonia.

Configuration of Controller 30

Next, a configuration of a controller 30 of the hydrogen engine 10 will be described with reference to FIG. 1. The controller 30 is configured as an electronic control module comprising processing circuitry 31 and storage 32. The storage 32 stores programs and data for controlling the hydrogen engine 10. The processing circuitry 31 reads a program from the storage 32 and executes the program to perform various processes for controlling the hydrogen engine 10.

Detection signals from various sensors for detecting the operating conditions of the hydrogen engine 10 are input to a controller 30. The various sensors include an air flow meter 33, a NOx sensor 34, an exhaust gas temperature sensor 35, a crank angle sensor 36, and an accelerator pedal sensor 37. The air flow meter 33 is a sensor that detects an intake air flow rate GA. The NOx sensor 34 is a sensor that detects the concentration of NOx in the exhaust gas flowing into the SCR device 23. The exhaust gas temperature sensor 35 is a sensor that detects the temperature of the exhaust gas flowing out from the SCR device 23. The crank angle sensor 36 detects a crank angle of the hydrogen engine 10. The accelerator pedal sensor 37 is a sensor that detects the amount of depression of the accelerator pedal.

A controller 30 determines an operation amount of the hydrogen engine 10 based on detection signals of these sensors. Then, the controller 30 controls the operating state of the hydrogen engine 10 by driving actuators of the hydrogen engine 10 based on the determined operation amount. The operation amounts determined by the controller 30 include the opening degree of the throttle valve 14, the hydrogen gas injection amount of the injector 15, the ignition timing of the ignition device 16, and the urea addition amount of the urea addition valve 20.

Air-Fuel Ratio Control of Hydrogen Engine 10

Next, the air-fuel ratio control of the hydrogen engine 10 executed by the controller 30 will be described. In the air-fuel ratio control, the controller 30 determines the required torque of the hydrogen engine 10 based on the amount of depression of the accelerator pedal, the engine speed, and the like. The engine rotation speed is the rotation speed of the crankshaft of the hydrogen engine 10. The controller 30 calculates the engine rotation speed based on the detection result of the crank angle sensor 36.

Subsequently, the controller 30 determines a target air-fuel ratio $\lambda t$ based on the required torque and the engine rotation speed. More specifically, the controller 30 determines, as the value of the target air-fuel ratio $\lambda t$, a limit value on the lean side of the air-fuel ratio in a range in which instability of combustion and deterioration of emission do not occur at an operating point of the hydrogen engine 10 determined by the required torque and the engine rotation speed.

Next, the controller 30 instructs the injector 15 to inject hydrogen gas in such an amount that a torque equal to the required torque is obtained. Then, the controller 30 controls the opening degree of the throttle valve 14 so that the air-fuel ratio of the air-fuel mixture burned in the combustion chamber 12 becomes equal to the target air-fuel ratio $\lambda t$.

Urea Addition Control for Hydrogen Engine 10

Next, urea addition control of the hydrogen engine 10 executed by the controller 30 will be described. The controller 30 estimates the internal temperature of the SCR device 23 based on the detection result of the exhaust gas temperature sensor 35 and the like. In the following description, the internal temperature of the SCR device 23 estimated by the controller 30 is referred to as an estimated SCR temperature. The controller 30 performs addition of urea water using the urea addition valve 20 on condition that the estimated SCR temperature is higher than or equal to an addition start temperature. When the hydrogen engine 10 is started, the lower limit value of the internal temperature of the SCR device 23 at which the SCR device 23 is activated to be able to purify NOx is set as the value of the addition start temperature.

During the urea water addition, the controller 30 calculates the inflow amount of NOx to the SCR device 23 based on the detection result of the NOx sensor 34 and the like. A controller 30 calculates an addition amount of urea water required for reduction and purification of NOx corresponding to the inflow amount. Then, the controller 30 drives the urea addition valve 20 so as to add the calculated amount of urea water.

Urea Deposition Suppressing Control

Urea is gradually deposited in the SCR device 23 of the hydrogen engine 10. When the urea deposition amount of the SCR device 23 exceeds a certain amount, the SCR device 23 cannot sufficiently exhibit the NOx purification ability. The controller 30 of the present embodiment performs urea deposition suppressing control for suppressing urea deposition in the SCR device 23.

Figure 2:
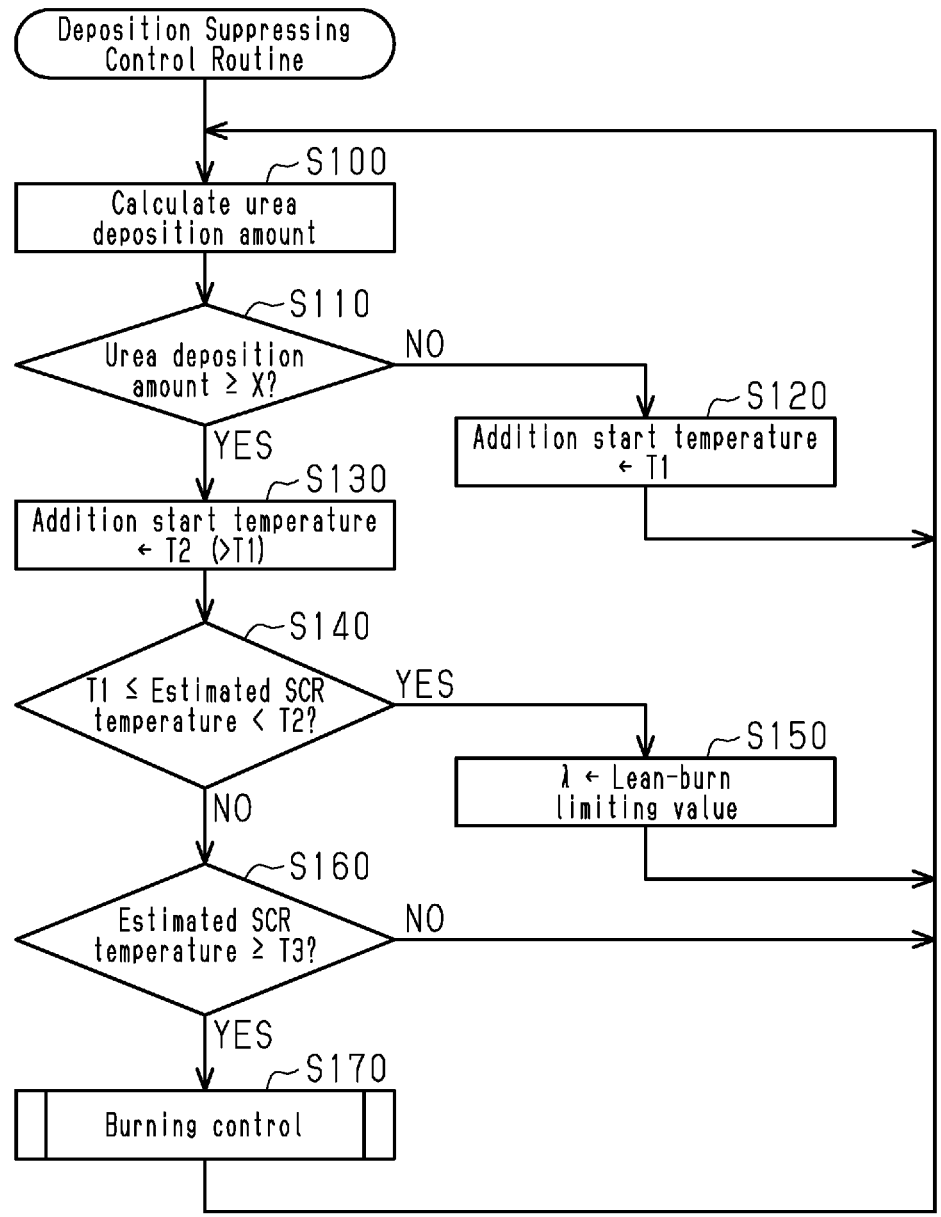
FIG. 2 is a flowchart of a urea deposition suppressing control routine executed by the controller.

FIG. 2 shows a flowchart of a urea deposition suppressing control routine executed by the controller 30 for the urea deposition suppression control. The controller 30 starts the processing of this routine after the hydrogen engine 10 is started.

When this routine is started, the controller 30 first calculates the urea deposition amount in the SCR device 23 in step S100. When calculating the urea deposition amount, the controller 30 calculates the amount of urea newly deposited in the SCR device 23 based on the amount of urea water added by the urea addition valve 20. The controller 30 controller 30 calculates the amount of urea thermally decomposed in the SCR device 23. Next, the controller 30 calculates the increase amount of the urea deposition amount in the SCR device 23 by subtracting the amount of thermally decomposed urea from the amount of newly deposited urea. Then, the controller 30 calculates the urea deposition amount by adding the calculated increase amount to the value of the urea deposition amount up to that time.

In the next step S110, the controller 30 determines whether or not the urea deposition amount is greater than or equal to a specified value X. When the urea deposition amount is less than the specified value X (NO), the controller 30 sets a specified first temperature T1 as a value of the addition start temperature in step S120. The first temperature T1 is set to a lower limit value of a temperature range of the SCR device 23 in which NOx can be satisfactorily purified. Then, the controller 30 waits for a specified control cycle to elapse, and resumes the processing of this routine from step S100.

On the other hand, when the urea deposition amount is greater than or equal to the specified value X (YES), the controller 30 sets a specified second temperature T2 higher than the first temperature T1 as the addition start temperature in step S130. Subsequently, in step S140, the controller 30 determines whether or not the estimated SCR temperature is higher than or equal to the first temperature T1 and lower than the second temperature T2.

When the estimated SCR temperature is higher than or equal to the first temperature T1 and lower than the second temperature T2 (S140: YES), the controller 30 sets a specified lean-burn limiting value as the value of the target air-fuel ratio λt in step S150. Then, the controller 30 resumes the processing of this routine from step S100 after the elapse of the control cycle.

As described above, the controller 30 usually determines the target air-fuel ratio λt based on the required torque and the engine rotation speed. The lean-burn limiting value is set to a value richer than the upper limit value of the setting range of the target air-fuel ratio λt, which is determined based on the required torque and the engine rotation speed.

On the other hand, when the estimated SCR temperature is lower than the first temperature T1 or higher than or equal to the second temperature T2 (S1440: NO), the controller 30 proceeds to step S160. In step S160, the controller 30 determines whether or not the estimated SCR temperature is higher than or equal to a specified third temperature T3. In the third temperature T3, a temperature higher than the second temperature T2 is set as a value. When the estimated SCR temperature is lower than the third temperature T3 (S160: NO), the controller 30 resumes the processing of the present routine from step S100 after the elapse of the control cycle.

On the other hand, when the estimated SCR temperature is higher than or equal to the third temperature T3 (S160: YES), in step S170, the controller 30 executes the burning control for burning the urea deposited in the SCR device 23. Then, the controller 30 restarts the processing of this routine from step S100 after the end of the burning control.

Burning Control

Next, the burning control will be described in detail with reference to FIG. 3. FIG. 3 shows changes in the parameters of the hydrogen engine 10 during and before and after the execution of the burning control. That is, the transition of the estimated SCR temperature is shown in section (a) of FIG. 3, the transition of the target air-fuel ratio λt is shown in section (b) of FIG. 3, the transition of the ignition timing is shown in section (c) of FIG. 3, and the transition of the urea deposition amount is shown in section (d) of FIG. 3.

Figure 3:
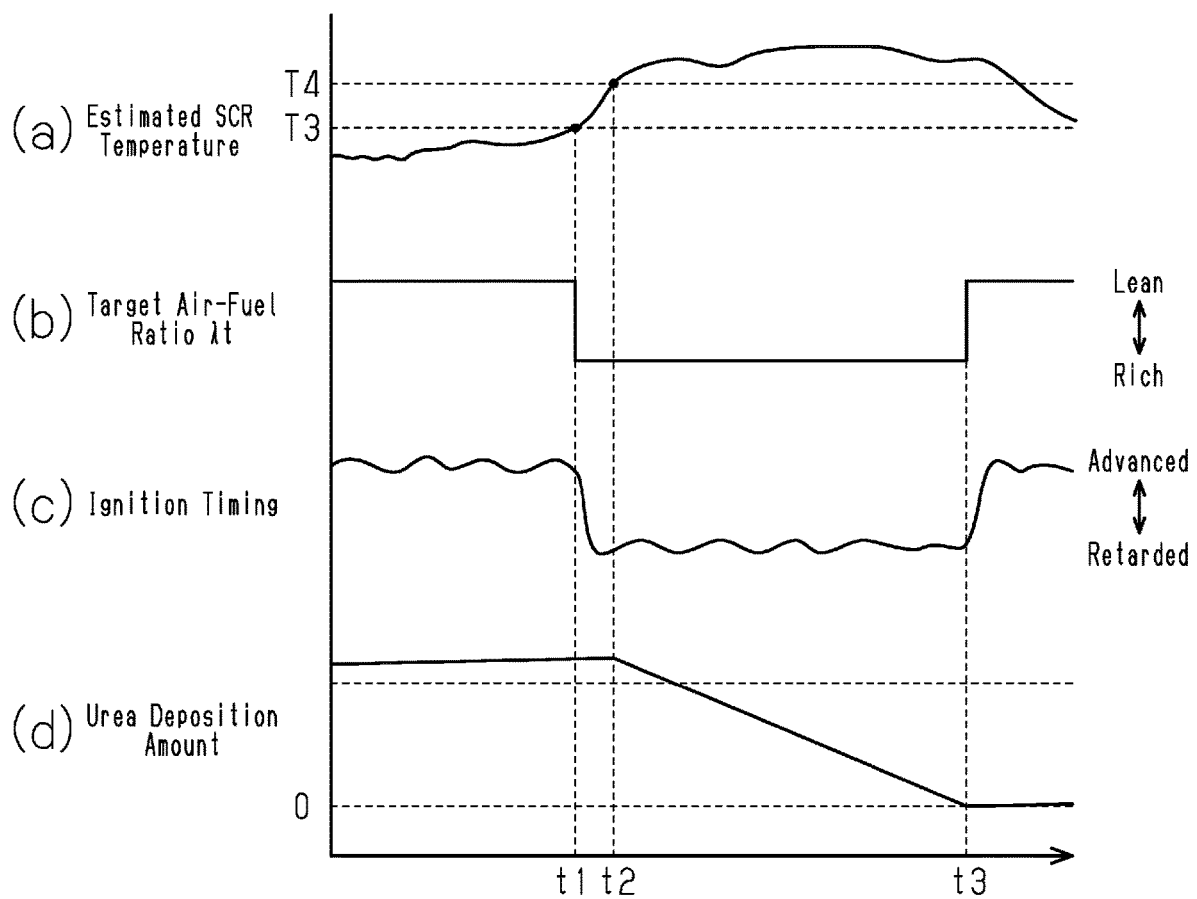
FIG. 3 is a timing diagram of a burning control by the controller, where section (a) shows changes in an estimated SCR temperature, section (b) shows changes in a target air-fuel ratio, section (c) shows changes in ignition timing, and section (d) shows changes in a urea deposition amount.

In the case of FIG. 3, the estimated SCR temperature rises to the third temperature T3 at the time t1. The controller 30 starts the burning control at this time t1. The controller 30 calculates the duration of the burning control required for burning the deposited urea based on the urea deposition amount in the SCR device 23 at the start of the burning control. In response to the start of the burning control, the controller 30 changes the target air-fuel ratio λt to the rich side as shown in section (b) of FIG. 3. Further, as shown in section (c) of FIG. 3, the controller 30 retards the ignition timing in response to the start of the burning control.

By enriching the target air-fuel ratio λt and retarding the ignition timing, the temperature of the exhaust gas discharged from the combustion chamber 12 to the exhaust passage 13 increases. Accordingly, the internal temperature of the SCR device 23 also rises.

At the subsequent time t2, when the internal temperature of the SCR device 23 rises to the burning temperature T4 required for the burning of urea, the burning of urea deposited in the SCR device 23 is started. At time t3, when the duration has elapsed from time t1 and the urea deposition amount in the SCR device 23 becomes 0, the controller 30 terminates the burning control by canceling the enrichment of the target air-fuel ratio λt and the retardation of the ignition timing.

Operation and Advantages of Embodiment

Operation and advantages of the present embodiment will now be described.

The controller 30 performs addition of urea water using the urea addition valve 20 on condition that the estimated SCR temperature is higher than or equal to the addition start temperature. When the urea deposition amount in the SCR device 23 is less than the specified value X, the controller 30 sets the addition start temperature to the first temperature T1. When the urea deposition amount is greater than or equal to the specified value X, the controller 30 sets the addition start temperature to a second temperature T2, which is higher than the first temperature T1. Therefore, in a case in which the urea deposition amount is less than the specified value X, the urea water addition is performed by the urea addition valve 20 if the estimated SCR temperature is higher than or equal to the first temperature T1. On the other hand, in a case in which the urea deposition amount is greater than or equal to the specified value X, even if the estimated SCR temperature is higher than or equal to the first temperature T1, the urea water addition by the urea addition valve 20 is not performed if the estimated SCR temperature is lower than the second temperature T2. As described above, when the urea deposition amount in the SCR device 23 is greater than or equal to the specified value X, the controller 30 performs a reduction process of reducing, to 0, the amount of urea addition of the urea addition valve 20 at the time when the estimated SCR temperature is higher than or equal to the first temperature T1 and lower than the second temperature T2.

In a case in which the urea deposition amount is greater than or equal to the specified value X, the controller 30 sets the value of the target air-fuel ratio λt to the lean-burn limiting value when the estimated SCR temperature is higher than or equal to the first temperature T1 and lower than the second temperature T2. Thus, in the lean-burn limiting process, the air-fuel ratio of the air-fuel mixture burned in the hydrogen engine 10 is fixed to the lean-burn limiting value. On the other hand, as described above, in a case in which the urea deposition amount is greater than or equal to the specified value X, the controller 30 reduces the urea addition amount through the reduction process when the estimated SCR temperature is higher than or equal to the first temperature T1 and lower than the second temperature T2. As described above, the controller 30 according to the present embodiment performs the lean-burn limiting process for setting the air-fuel ratio to be less than or equal to the specified lean-burn limiting value during reduction of the urea addition amount by the reduction process. The lean-burn limiting value is richer than the upper limit value of the control range of the air-fuel ratio in a case in which the reduction process is not reducing the urea addition amount.

When the temperature of the SCR device 23 is low, the deposition of urea in the SCR device 23 easily progresses. In the reduction process, the controller 30 raises the urea-addition start temperature from the first temperature T1 to the second temperature T2 when the urea deposition amount is greater than or equal to the specified value X. As a result, in the case in which the urea deposition amount is greater than or equal to the specified value X, the urea-addition is not performed when the estimated SCR temperature is equal to or lower than the second temperature T2. Therefore, the progress of urea deposition in the SCR device 23 when the urea deposition amount becomes greater than or equal to the specified value X is suppressed.

In the range of the estimated SCR temperature higher than or equal to the first temperature T1 and lower than the second temperature T2, the urea-addition is performed when the urea deposition amount is lower than the specified value X, but is not performed when the urea-deposition amount is higher than or equal to the specified value X. When urea addition is not performed, the SCR device 23 cannot purify NOx in the exhaust gas by using ammonia derived from urea as a reducing agent. On the other hand, the amount of NOx produced by combustion in the hydrogen engine 10 increases as the air-fuel ratio becomes leaner. On the other hand, the controller 30 performs the lean limiting process during reduction of the urea-addition by the reduction process. As a result, in the hydrogen engine 10, combustion is not performed at an air-fuel ratio on the lean side of the lean-burn limiting value, so that generation of NOx is suppressed. As a result, an increase in the emission of NOx to the outside air due to the stop of the urea addition for suppressing the urea deposition is suppressed.

According to the controller 30 for the hydrogen engine 10 of the present embodiment described above, the following effects can be achieved.
  (1) The controller 30 performs the reduction process and the lean-burn limiting process as described above, so that the progress of the urea deposition in the SCR device 23 can be suppressed while suppressing the release of NOx to the outside air.
  (2) The controller 30 performs the reduction process, in which the controller 30 sets the addition start temperature to the first temperature T1 when the urea deposition amount is less than the specified value X, and sets the addition start temperature to the second temperature T2, which is higher than the first temperature T1, when the urea deposition amount is greater than or equal to the specified value X. Since urea addition at a low temperature at which urea deposition is likely to progress in the reduction process is prohibited, the progress of urea deposition in the SCR device 23 is effectively suppressed.
  (3) In a case in which the urea deposition amount is greater than or equal to the specified value X and the estimated SCR temperature is higher than or equal to the third temperature T3, the controller 30 performs the burning control for increasing the temperature of the SCR device 23 to be higher than or equal to the temperature T4 required for burning urea. Accordingly, it is possible to prevent urea from being excessively deposited in the SCR device 23.
  (4) When the air-fuel ratio is enriched and the ignition timing is by the burning control, the combustion efficiency is reduced, and thus the fuel consumption of the hydrogen engine 10 is increased. On the other hand, the execution time of the burning control becomes longer as the temperature of the SCR device 23 at the start of the burning control becomes lower. On the other hand, the controller 30 of the present embodiment executes the burning control on condition that the estimated SCR temperature is higher than or equal to the third temperature T3. As a result, the burning control can be prevented from being prolonged. Further, an increase in fuel consumption associated with the execution of the burning control is also suppressed.
  (5) a diesel particulate filter (DPF) for trapping particulate matter (PM) in the exhaust gas;

There is a diesel engine installed in an exhaust passage. In the case of such a diesel engine, filter regeneration control for burning and purifying the PM deposited in the DPF is performed. Then, urea deposited in the SCR device during the filter regeneration control is burned. Therefore, urea deposition in the SCR device can be suppressed without separately performing burning control. On the other hand, in the case of the hydrogen engine 10, it is necessary to perform a burning control for burning urea deposited in the SCR device 23. In the control device (controller) 30 of the present embodiment, urea deposition in the SCR device 23 is suppressed by the reduction process and the lean limitation processing. Therefore, it is possible to reduce the frequency of performing the burning control and to shorten the time for performing the burning control.
  (6) The controller 30 performs the burning control by changing the air-fuel ratio to the rich side and retarding the ignition timing. As a result, the temperature of the SCR device 23 is raised and the deposited urea can be burned.

Other Embodiments

The present embodiment may be modified as follows. The present embodiment and the following modifications can be combined as long as the combined modifications remain technically consistent with each other.

Burning Control

In the above-described embodiment, the burning control is performed by enriching the air-fuel ratio and retarding the ignition timing. The burning control may be performed by raising the temperature of the SCR device 23 to a temperature higher than or equal to the burning temperature of urea by another method. For example, the burning control may be performed by only one of enriching the air-fuel ratio and retarding the ignition timing.

In the above embodiment, the burning control is executed when the urea deposition amount in the SCR device 23 is greater than or equal to the specified value X and the estimated SCR temperature is higher than or equal to the third temperature T3. The execution conditions of the burning control may be changed to other conditions.

The execution of burning control is not essential. If the temperature of the SCR device 23 rises to or above the temperature at which urea can be burned even during normal operation or by other control, excessive deposition of urea in the SCR device 23 can be avoided even if the burning control is not performed.

Lean Limitation Processing

In the above embodiment, the target air-fuel ratio λt is fixed to the lean-burn limiting value in the lean-burn limiting processing. In the lean-burn limiting processing, the target air-fuel ratio λt may be variably set within a range of the air-fuel ratio on the rich side of the lean-burn limiting value.

In the above embodiment, the execution time of the lean limitation processing is determined based on the urea deposition amount in the SCR device 23 at the start of the lean limitation processing. The execution time of the lean limitation processing may be determined by another method. For example, the urea deposition amount of the SCR device 23 is calculated during the lean limitation processing. Then, the lean limitation processing may be executed until the urea deposition amount becomes less than or equal to a specified value.

Reduction Process

In the above-described embodiment, the process of raising the addition start temperature from the first temperature T1 to the second temperature T2 is performed as the reduction process. When the urea deposition amount of the SCR device 23 is greater than or equal to the specified value X, other processing may be performed as the reduction process as long as the urea addition amount of the urea addition device is reduced more than when the urea deposition amount of the SCR device 23 is smaller than the specified value X. In any case, if the urea addition amount is decreased, the NOx purification ability of the SCR device 23 decreases. Therefore, it is desirable to execute the lean-burn limiting process during reduction of the urea addition amount by the reduction process to reduce the amount of NOx generated by combustion in order to suppress the emission of NOx to the outside air.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a hydrogen engine, the controller being configured to control the hydrogen engine including a selective catalytic reduction device installed in an exhaust passage and a urea addition device that adds urea to exhaust gas flowing through a portion of the exhaust passage upstream of the selective catalytic reduction device, the controller comprising processing circuitry, wherein
the processing circuitry is configured to execute
a urea addition process that adds urea to the exhaust gas using the urea addition device on condition that a temperature of the selective catalytic reduction device is higher than or equal to an addition start temperature;
a reduction process that reduces a urea addition amount of the urea addition device when a urea deposition amount of the selective catalytic reduction device is greater than or equal to a prescribed value, and
a lean-burn limiting process that sets an air-fuel ratio of an air-fuel mixture to be burned in the hydrogen engine to a value less than or equal to a prescribed lean-burn limiting value while the reduction process is reducing the urea addition amount, and
the lean-burn limiting value is richer than an upper limit value of a control range of the air-fuel ratio in a case in which the reduction process is not reducing the urea addition amount, and
the reduction process includes reducing the urea addition amount of the urea addition device to zero in a case in which the urea deposition amount is greater than or equal to the prescribed value and when the temperature of the selective catalytic reduction device higher than or equal to a first temperature and lower than a second temperature.

2. The controller for the hydrogen engine according to claim 1, wherein the lean-burn limiting process includes fixing the air-fuel ratio to the lean-burn limiting value.

3. The controller for the hydrogen engine according to claim 1, wherein the processing circuitry is configured to execute burning control that raises the temperature of the selective catalytic reduction device to a temperature higher or equal to a temperature required for burning of the urea when the urea deposition amount is greater than or equal to the prescribed value and the temperature of the selective catalytic reduction device is higher than or equal to a prescribed temperature.

4. The controller for the hydrogen engine according to claim 3, wherein the burning control includes making the air-fuel ratio richer and retarding an ignition timing.

5. The controller for the hydrogen engine according to claim 4, wherein the processing circuitry terminates the burning control by canceling enrichment of the target air-fuel ratio and retardation of the ignition timing.

* * * * *